2,744,817

METHOD AND COMPOSITION FOR THE CONTROL OF THE GROWTH OF UNDESIRABLE VEGETATION

Burton V. Toornman, Scotts, Mich., assignor to The Dow Chemical Company, Midland, Mich., a corporation of Delaware No Drawing. Application October 13, 1954,
Serial No. 462,101

11 Claims. (Cl. 71—2.3)

This invention is concerned with the suppression of the growth of vegetation and is particularly directed to a composition and method for the suppression and control of the growth of the germinant seeds and emerging seedlings of undesirable vegetation.

In recent years the use of chemical materials for the control of the growth of vegetation has found widespread acceptance among agriculturists. However, the practice of such chemical control has brought into focus shortcomings in commonly employed procedures. Thus, the herbicide chemicals currently used are sometimes as toxic to established plants as they are to seeds and emerging seedlings. Also, it has generally not been possible to obtain a selective control of the growth of undesirable seeds and emerging seedlings in soil which is planted with the seeds of desirable crop plants or supporting the growth of established crop plants. Further, the selective control of weeds in established crop plants is oftentimes carried out at a time when the weeds have already depleted the soil of moisture and nutrients.

It is an object of the present invention to provide a new method for the suppression and control of the growth of undesirable vegetation and particularly for the suppression of the growth of grasses of the sub-family Panicoideae. A further object is to provide a method for the suppression of the growth of undesirable seeds and emerging seedlings, and particularly those of grasses of the sub-family Panicoideae, in soil or growth media which is planted with the seeds of broad-leaf crop plants or supporting the growth of established plants. Another object is the provision of a novel composition adapted to be employed for the accomplishment of the new method of growth control. Other objects will become apparent from the following specification and claims.

According to the present invention, it has been discovered that the growth of many germinant seeds and emerging seedlings, and particularly those of certain grasses, may be suppressed by exposing the germinant seeds and emerging seedling rootlets to the action of N,N-diphenyl crotonamide. This compound is a crystalline solid melting at 114°–115° C. which is somewhat soluble in aliphatic ketones, chlorinated hydrocarbons and aliphatic alcohols and of very low solubility in water. It appears to have a high toxicity against the germinant seeds and emerging seedlings of certain grasses and particularly to those of the sub-family Panicoideae such as common crab, fox tail, witch grass, tickle grass, and millet. Thus, it may be employed for the selective control of the germinant seeds and emerging seedlings of various grasses in growth media planted with many species of desirable crop plants or supporting the growth of such plants. Further, the N,N-diphenyl crotonamide compound has a high degree of persistency in soil and gives excellent controls for periods ranging up to several months.

The introduction of N,N-diphenyl crotonamide into soil or growth media gives rise to varying degrees of response in germinant seeds, emerging seedlings and growing plants depending upon the nature of the seed or plant and the dosage dispersed in the growth media. When very large dosages are dispersed in growth media, a temporary inhibition of the growth of seeds, seedlings and established plants is obtained. This approaches a sterilizing action. The weathering action of the sun and rain and possibly the decomposition of the toxic compound by the action of soil organisms eventually frees the growth media of the toxicant. In smaller dosages the N,N-diphenyl crotonamide compound suppresses the growth of the seeds and emerging seedlings of certain grass species, and particularly those of the sub-family Panicoideae, while having little or no effect upon the seeds and emerging seedlings of many desirable plant species or upon the established plants of such species. Where many established crop plants are concerned, foliar applications of the smaller dosages of the N,N-diphenyl crotonamide compound have no appreciable detrimental effect upon the plants. Thus, it is possible to effect a selective treatment of fixed seedings of grasses and many desirable crop plants, or a selective treatment of seedings of grasses in established crop plants.

The distribution of a growth-inhibiting amount of N,N-diphenyl crotonamide in soil or growth media is essential for the practice of the present invention. In non-selective applications to growth media, good results are obtained when a dosage of N,N-diphenyl crotonamide is supplied in the amount of from about 4 to 400 parts or more by weight per million parts by weight of the medium. In general field appplications, good results are obtained when the crotonamide compound is distributed at a rate of from about one to 250 pounds or more per acre and through such a cross-section of the soil as to provide for the presence therein of an effective concentration of the treating agent. In such applications it is desirable that the compound be distributed to a depth of at least 0.5 inch and at a dosage of at least one pound per acre-inch of soil. In selective applications for the control of the growth of the germinant seeds and emerging seedlings of several grass species, and particularly those of the sub-family Panicoideae, in areas planted with many desirable crop plants, or supporting the growth of such plants, a dosage of from 4 to 128 parts by weight of toxicant per million parts by weight of soil is desirable.

The method of the present invention may be carried out by applying to and mixing with growth media the unmodified crotonamide compound. However, the present method also embraces the employment of a liquid or dust composition containing the toxicant. In such usage, the crotonamide compound may be modified with additaments or herbicide adjuvants such as water, surface-active dispersing agents and finely divided inert solids. Depending upon the concentration of toxicant, such augmented compositions are adapted to be distributed in the soil, or employed as concentrates and subsequently diluted with additional inert carrier to produce the ultimate treating composition. The required amount of the crotonamide compound in the growth media conveniently may be supplied per acre treated in from 40 to 27,000 gallons or more of the liquid carrier or in from about 50 to 2,000 pounds of the inert solid carrier.

The exact concentration of the crotonamide compound to be employed in compositions for the treatment of growth media may vary provided the required dosage of effective agent is supplied. The concentration of toxicant in liquid compositions employed to supply the desired dosage generally is from about 0.01 to 50 percent by weight. In dusts, the concentration of toxicant may be from about 1 to 50 percent by weight. In compositions to be employed as concentrates, the toxicant may be present in a concentration of from about 5 to 95 percent by weight.

Liquid compositions containing the desired amount of crotonamide compound may be prepared by dispersing the toxicant in water with the aid of a suitable surface active dispersing agent such as an ionic or non-ionic emulsifying agent. The choice of dispersing and emulsifying agent and the amount thereof employed is dictated by the nature of the composition and by the ability of the agent to facilitate the dispersion of the crotonamide compound in the aqueous carrier to produce the desired composition. Dispersing and emulsifying agents which may be employed in the compositions include the condensation products of alkylene oxides with phenols and organic acids, alkyl aryl sulfonates, polyoxyethylene derivatives of sorbitan esters, mahogany soaps, complex ether alcohols and the like.

In the preparation of dust compositions, the N,N-diphenyl crotonamide is dispersed in and on a finely divided inert solid such as talc, chalk, gypsum and the like. In such operations, the carrier is mechanically mixed and ground with the crotonamide compound. Similarly, dust compositions containing the crotonamide compound may be prepared from various of the solid surface-active dispersing agents such as bentonite, fuller's earth, attapulgite and other clays. Depending upon the proportion of ingredients, these dust compositions may be employed as concentrates and subsequently diluted with additional solid surface-active dispersing agent or with talc, chalk or gypsum and the like to obtain the desired amount of active ingredient in a composition adapted to be applied for the control of the growth of the vegetation. Also, such concentrate dust compositions may be dispersed in water with the aid of a surface-active dispersing agent to form spray mixtures.

When operating in accordance with the present invention, growth-inhibiting amounts of the crotonamide compound or a composition containing the toxicant are dispersed in any convenient fashion in soil or growth media, i. e. by simple mixing with the growth media, by applying to the surface of soil and thereafter dragging or discing into the soil to the desired depth, or by employing a liquid carrier to accomplish the penetration and impregnation of the soil.

In a further method, the distribution may be accomplished by introducing the toxicant in the water employed to irrigate the soil. In such procedure, the amount of water may be varied in accordance with the porosity and water-holding capacity of the soil in order to obtain the desired depth of distribution of the toxicant.

The following examples illustrate the invention but are not to be construed as limiting the same:

*Example 1*

25 parts by weight of N,N-diphenyl crotonamide, 71 parts of diatomaceous earth, 2 parts of an alkyl aryl sulfonate (Nacconal NR) and 2 parts of a polymerized sodium salt of substituted benzoid alkyl sulfonic acids (Daxad No. 27) are mechanically mixed and ground together to prepare a concentrate composition in the form of a wettable powder.

In a similar manner, 15 parts by weight of N,N-diphenyl crotonamide, 0.1 part of Nacconal NR, 0.1 part of Daxad No. 27 and 200 parts of water are ball-milled together to prepare a water dispersible concentrate composition in the form of a liquid suspension.

Also, 15 parts by weight of N,N-diphenyl crotonamide, 10 parts of a dimeric alkylated aryl polyether alcohol (Triton X–155) and 200 parts of water are ball-milled together to prepare a water dispersible concentrate composition.

These concentrate compositions may be dispersed in water to prepare aqueous compositions which have very desirable wetting and penetrating properties. The latter aqueous compositions are adapted to be employed to treat soil and distribute N,N-diphenyl crotonamide therein in growth-inhibiting concentrations.

*Example 2*

The wettable powder concentrate composition of Example 1 was dispersed in water to prepare aqueous compositions containing 0.06, 0.12, 0.24 and 0.36 pound of N,N-diphenyl crotonamide per 100 gallons of ultimate mixture. These aqueous compositions were employed for the treatment of soil and observations made of the control of the growth of the seeds and emerging seedlings of crab grass, Kentucky bent grass, creeping red fescue grass and red-top grass. In the determinations, the compositions were employed to treat soil areas which had been prepared and seeded with the named grass species. In the treating operations, the compositions were applied as a soil drench and at a rate of about 0.305 acre-inch of composition per acre to supply substantially uniform dosages of 5, 10, 20 and 30 pounds of N,N-diphenyl crotonamide per acre. These dosages correspond, respectively, to concentrations of about 8, 16, 32 and 48 parts by weight of N,N-diphenyl crotonamide per million parts by weight of soil. Other soil areas similarly seeded with the named plant species were left untreated to serve as checks. After two weeks, the treated areas were examined to ascertain what control of the growth of seeds and emerging seedlings had been obtained. The results are set forth in the following table:

| Seed Species | Percent Control of Growth of Seeds and Emerging Seedlings at the Various Indicated Concentrations of Toxicant in Parts by Weight per Million Parts by Weight of Soil | | | |
| --- | --- | --- | --- | --- |
|  | 8 | 16 | 32 | 48 |
| Crabgrass | 70 | 80 | 92 | 95 |
| Kentucky Blue Grass | 0 | 0 | 0 | 5 |
| Colonial Bent Grass | 0 | 0 | 0 | 0 |
| Creeping Red Fescue Grass | 0 | 0 | 0 | 0 |
| Red-top Grass | 0 | 0 | 0 | 20 |

At the time of observation the check areas were found to support luxuriant and vigorously growing stands of the named grass species.

*Example 3*

The wettable powder concentrate composition of Example 1 was dispersed in water to prepare aqueous compositions containing 0.15, 0.3 and 0.6 pound of N,N-diphenyl crotonamide per 100 gallons of ultimate mixture. These compositions were employed for the treatment of soil and observations made of the control of the growth of the seeds and emerging seedlings of various grass species, broad-leafed weeds and broad-leafed crop plants. The grass type species included crab grass, witch grass, foxtail, timothy, wild oats, wheat, rye, and barley and the broad-leafed plants included corn, soybeans, turnips, cucumbers, cotton, radish, peas, pigweed, lamb's quarters, carrots and flax. In the determinations, the compositions were employed to treat soil areas which had been prepared and seeded with the named plant species. In the treating operations, the compositions were applied as a soil drench and at a rate of about 0.305 acre-inch of composition per acre to supply substantially uniform dosages of 12.5, 25 and 50 pounds of N,N-diphenyl crotonamide per acre. These dosages correspond, respectively, to concentrations of about 20, 40 and 72 parts by weight of N,N-diphenyl crotonamide per million parts by weight of soil. Other areas similarly seeded with the named plant species were left untreated to serve as checks. After 18 days the areas were examined to ascertain what control of the growth of seeds and emerging seedlings had been obtained. It was found that the treatments with the N,N-diphenyl crotonamide compositions had no effect upon the germination of the seeds and the growth of the seedlings of wheat, wild oats, rye, barley, timothy, corn, soybeans, turnips, cucumbers, cotton, radish, peas, pigweed, lamb's quarters, carrots, and flax. The following table sets forth the results obtained upon crab grass, witch grass, foxtail and onion.

| Seed Species | Percent Control of Growth of Seeds and Emerging Seedlings at the Various indicated Concentrations of Toxicant in Parts by Weight per Million Parts by Weight of Soil | | |
|---|---|---|---|
| | 20 | 40 | 72 |
| Crab Grass | 67.5 | 84.3 | 100 |
| Witch Grass | 79.2 | 94.4 | 100 |
| Foxtail | 71.6 | 100 | 100 |
| Onion | 10 | 50 | 80 |

*Example 4*

Sandy loam soil of good nutrient content was spread in flats to a depth of about 3 inches and the soil in the flats thereafter treated with aqueous compositions containing 0.15, 0.3 and 0.6 pound of N,N-diphenyl crotonamide per 100 gallons of ultimate mixture. The employed aqueous compositions were prepared from the wettable powder concentrate composition of Example 1. In the treating operations the compositions were applied to the soil in the flats as a soil drench and at a rate of 0.305 acre-inch of aqueous composition per acre to supply relatively uniform dosages of 12.5, 25 and 50 pounds of N,N-diphenyl crotonamide per acre. These dosages correspond, respectively, to about 20, 40 and 72 parts by weight of N,N-diphenyl crotonamide per million parts by weight of soil. Prior to treatment the flats were seeded with a row of crab grass and thereafter seeded to additional single rows of crab grass at weekly intervals. Untreated check flats of the same soil were also similarly seeded to rows of crab grass at the same intervals as the treated flats. In the determinations, the treated flats and untreated check flats were maintained in a greenhouse at an average temperature of 80° F. and watered in an amount corresponding to ¼ inch of rainfall per day. At regular intervals, observations were made to determine the control of the growth of the seeds and emerging seedlings of crab grass obtained on each of the successive plantings. The results are set forth in the following table:

| Concentration of N,N-Diphenyl Crotonamide in Parts by Weight per Million parts by Weight of Soil | Percent Control of the Growth of Seeds and Emerging Seedlings as Obtained at the Indicated Planting Intervals After Treatment | | | | | |
|---|---|---|---|---|---|---|
| | 0 days | 7 days | 14 days | 21 days | 28 days | 35 days |
| 20 | 68 | 30 | 0 | 0 | 0 | 0 |
| 40 | 85 | 75 | 40 | 30 | 15 | 5 |
| 72 | 95 | 95 | 95 | 95 | 80 | 50 |

At the various times of observation, the corresponding check areas were found to support vigorously growing stands of crab grass.

*Example 5*

An aqueous composition containing 0.32 pound of N,N-diphenyl crotonamide per 100 gallons of ultimate composition was employed for the treatment of a sandy loam soil of good nutrient content. The employed composition was prepared as previously described from the wettable powder concentrate composition of Example 1. In the treating operations the composition was applied to the soil as an aqueous dispersion and at a rate of about 0.443 acre-inch of composition per acre to supply a dosage of 40 pounds of N,N-diphenyl crotonamide per acre. The latter corresponds to about 66 parts by weight of N,N-diphenyl crotonamide per million parts by weight of treated soil. Prior to the treatment the soil had been seeded to millet. Other soil areas similarly seeded were left untreated to serve as checks.

After three weeks the treated areas were examined and a 70 percent control of the growth of seeds and emerging seedlings of millet was observed. At the time of observation, vigorously growing stands of millet were found in the untreated checks.

*Example 6*

A wettable powder concentrate composition containing 50 parts by weight of N,N-diphenyl crotonamide, 46 parts of diatomaceous earth, 2 parts of Daxad No. 27 and 2 parts of Nacconal NR was dispersed in water to prepare aqueous compositions containing 10, 20, 40 and 80 pounds of N,N-diphenyl crotonamide per 110 gallons of ultimate mixture. These compositions were applied as foliar sprays to seedling stands of cotton, soybeans, flax, cucumber, corn, wheat, wild oats and millet. At the time of application the seedling stands were about ¾ of an inch in height. The treatments were carried out with conventional spraying equipment and at a dosage of 110 gallons per acre. Following the treatments, observations were carried out at regular intervals to determine the presence of any growth regulatory response in the treated plants, and no such response or adverse effect upon the growth of the treated plants attributable to the crotonamide compound was found.

*Example 7*

The wettable powder concentrate composition of Example 1 was dispersed in water to produce an aqueous composition containing 0.1 gram of N,N-diphenyl crotonamide per liter of ultimate mixture. This aqueous composition was employed for the treatment of soil areas and observations made of the control of the growth of the seeds and emerging seedlings of Johnson grass, Bermuda grass and crab grass. In the treating operations, the composition was applied as a soil drench and at a rate of about 0.44 acre-inch of composition per acre to supply a substantially uniform dosage of 50 pounds per acre. The latter corresponds to about 82 parts by weight of N,N-diphenyl crotonamide per million parts by weight of the treated soil. Immediately prior to treatment, the soil areas had been prepared and seeded with the named grass species. Similarly prepared and seeded soil areas were left untreated to serve as checks. After three weeks the treated areas were examined to ascertain what control of the growth of seeds and emerging seedlings has been obtained. The results are set forth in the following table:

| Seed Species | Percent Control of the Growth of the Seeds and Emerging Seedlings |
|---|---|
| Johnson Grass | 95 |
| Bermuda Grass | 100 |
| Crab Grass | 99 |

I claim:

1. A method for the control of the growth of vegetation which comprises applying to and mixing with a growth medium a growth-inhibiting amount of N,N-diphenyl crotonamide.

2. A method for the control of the growth of vegetation which comprises the step of contacting seeds and emerging seedling rootlets while positioned in a growth medium with a growth-inhibiting amount of N,N-diphenyl crotonamide.

3. A method for the control of the growth of vegetation which comprises impregnating soil with a growth-inhibiting amount of N,N-diphenyl crotonamide.

4. A method as claimed in claim 3 wherein the N,N-diphenyl crotonamide is present in the soil in the amount of at least 4 parts by weight per million parts by weight of the soil.

5. An agronomical practice which comprises distributing N,N-diphenyl crotonamide in soil to a depth of at least one-half inch below the soil surface and at a substantially uniform dosage of at least one pound per acre-inch of soil.

6. The method which comprises impregnating field soil with a composition made up of N,N-diphenyl crotonamide in admixture with an inert herbicide adjuvant as a carrier therefor, the impregnation being carried out so as to provide at least 4 parts by weight of the crotonamide compound per million parts by weight of soil.

7. A method for the selective control of the growth of germinant seeds and emerging seedlings of grasses of the sub-family Panicoideae in soil planted with broad-leaf crop plants, which comprises distributing N,N-diphenyl crotonamide in such soil in the amount of from 4 to 128 parts by weight per million parts by weight of soil.

8. A method for the selective control of the growth of the germinant seeds and emerging seedlings of grasses of the sub-family Panicoideae in soil supporting the growth of established crop plants, which comprises distributing N,N-diphenyl crotonamide in such soil in the amount of from 4 to 128 parts by weight per million parts by weight of the soil.

9. A concentrate composition which comprises as an active toxic ingredient N,N-diphenyl crotonamide in intimate admixture with at least one material selected from the group consisting of finely divided inert solids and surface-active dispersing agents, the crotonamide compound being present in the amount of from 5 to 95 percent by weight.

10. A concentrate composition as claimed in claim 9 wherein the active ingredient is admixed with a surface-active dispersing agent.

11. A composition for the suppression of the growth of vegetation which comprises an aqueous dispersion of the composition claimed in claim 9, the crotonamide compound being present in a plant growth inhibiting concentration.

No references cited.